United States Patent
Bennett et al.

(10) Patent No.: US 6,968,410 B2
(45) Date of Patent: Nov. 22, 2005

(54) MULTI-THREADED PROCESSING OF SYSTEM MANAGEMENT INTERRUPTS

(75) Inventors: Joseph A. Bennett, Roseville, CA (US); Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 09/793,965

(22) Filed: Feb. 28, 2001

(65) Prior Publication Data

US 2002/0120801 A1 Aug. 29, 2002

(51) Int. Cl.[7] .............................................. G06F 13/24
(52) U.S. Cl. ..................... 710/260; 710/267; 710/268; 710/269
(58) Field of Search ................................. 710/260–269, 710/46–50; 712/201, 202, 206, 231, 245

(56) References Cited

U.S. PATENT DOCUMENTS

| | | | | |
|---|---|---|---|---|
| 4,493,035 A | * | 1/1985 | MacGregor et al. | 714/21 |
| 5,878,264 A | * | 3/1999 | Ebrahim | 713/300 |
| 5,896,534 A | * | 4/1999 | Pearce et al. | 710/260 |
| 6,282,601 B1 | * | 8/2001 | Goodman et al. | 710/260 |
| 6,523,125 B1 | * | 2/2003 | Kohno et al. | 713/320 |
| 6,532,510 B2 | * | 3/2003 | Klein | 710/260 |
| 6,571,206 B1 | * | 5/2003 | Casano et al. | 703/25 |

* cited by examiner

Primary Examiner—Paul R. Myers
Assistant Examiner—Raymond N Phan
(74) Attorney, Agent, or Firm—Blakely, Sokoloff, Taylor and Zafman

(57) ABSTRACT

An information capturing technique captures information on a processor cycle that results in a high level interrupt, such as an SMI (System Management Interrupt). A memory controller is connected to at least one processor to control a memory in response to instructions from the at least one processor. An I/O controller is connected to the memory controller to control data flow to at least one device in response to instructions from the at least one processor. Lock down logic stores captured cycle information on a processor cycle that results in interrupt.

30 Claims, 3 Drawing Sheets

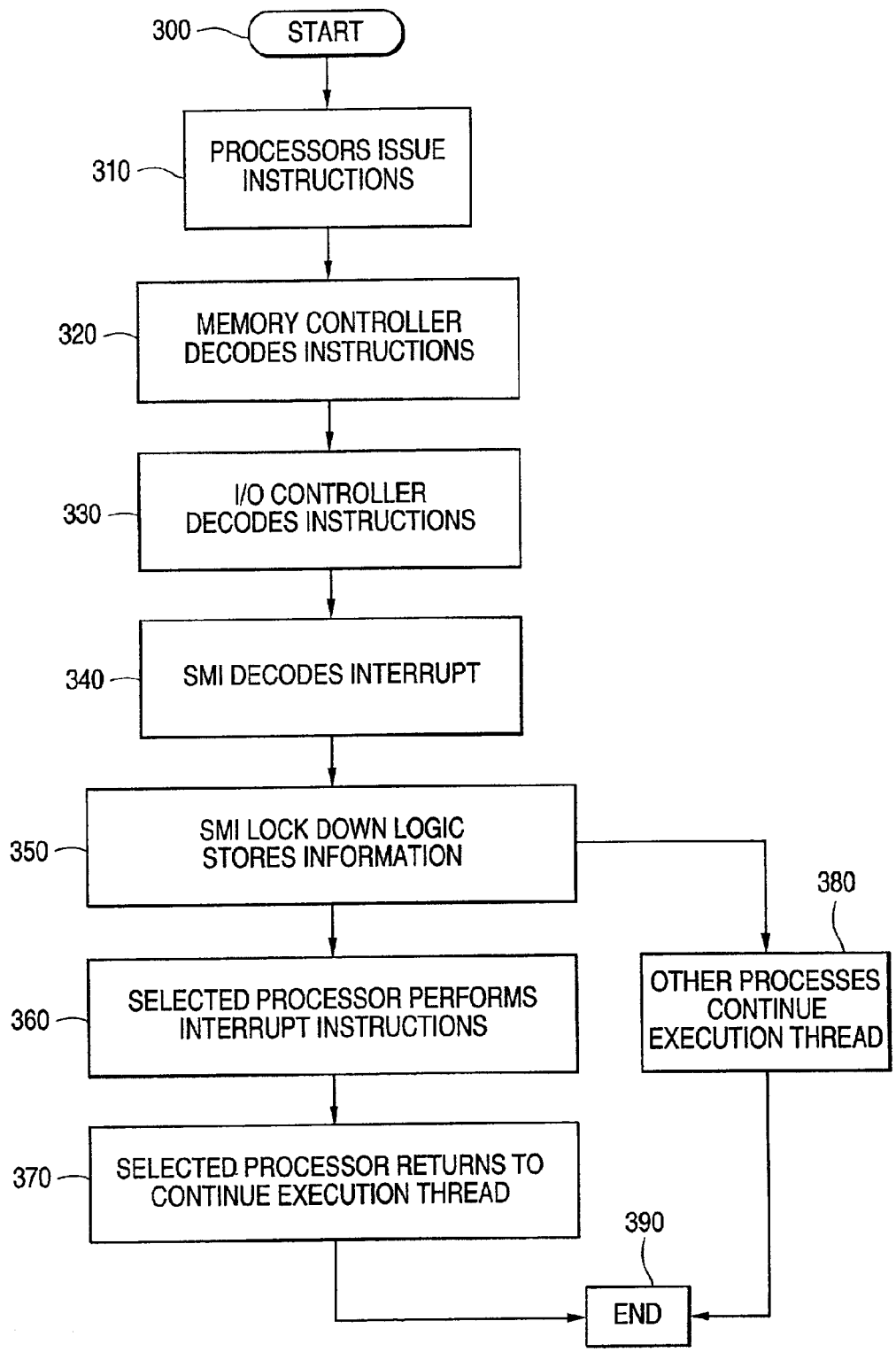

MULTI-THREADED PROCESSING OF SYSTEM MANAGEMENT INTERRUPTS

FIELD OF THE INVENTION

The present invention relates to a technique for capturing information and more particularly, the present invention relates to a technique for capturing cycle information on processor cycles that result in a high-level interrupted, such as an SMI (System Management Interrupt).

BACKGROUND OF THE INVENTION

The SMI is a high level interrupt which interrupts the normal program execution and invokes an SMM (System Management Mode) The SMI is normally but not exclusively used for power management in a processor or for workarounds. Upon a processor receiving an SMI on a pin generally designated for receiving an SMI, for example, an SMI# pin, the processor waits for all pending bus cycles to be completed and then asserts an SMIACT# (System Management Interrupt Active) signal, thereby entering the SMM mode and enabling a memory to allow the processor to save its state (context) in the memory. The processor, after saving its state in the memory and switching to the SMM processor environment, then jumps to a predetermined address in the memory to execute a previously stored SMI handler which performs the necessary system management activities. After the necessary system management activities have been performed, the SMI handler executes an instruction which restores the processor's state from the memory, deasserts the SMIACT# signal and then returns control to the previously interrupted program which was being executed by the processor.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 3 is a flowchart illustrating the operation of an example embodiment in accordance with the present invention.

DETAILED DESCRIPTION

Figure 1:
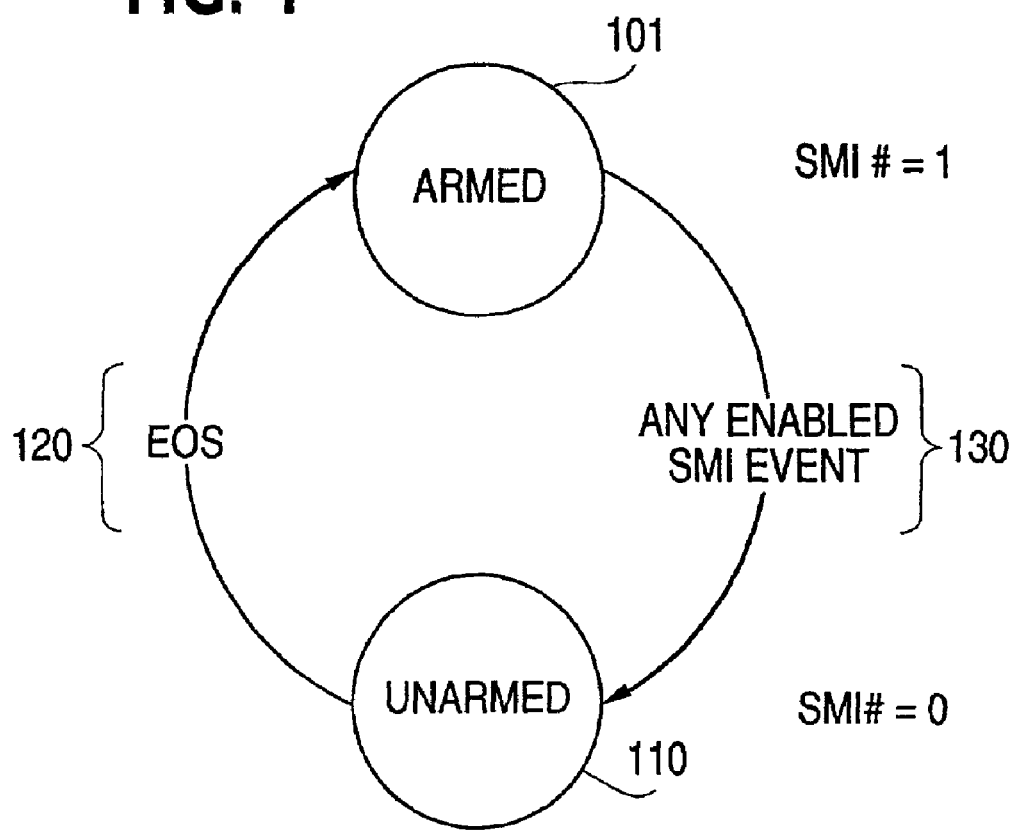
FIG. 1 illustrates an example of the operation of SMI generation logic.

Before beginning a detailed description of the subject invention, mention of following is in order. When appropriate, like reference numerals and characters may be used to designate identical, corresponding, or similar components in differing drawing figures. Furthermore, in the detailed description to follow, example sizes/model/values/ranges may be given, although the present invention is not limited thereto. Still furthermore, various signals are not draw to scale and instead, exemplary and critical values are mentioned when appropriate. With regard to description of any signals, the terms assertion and negation may be used in an intended generic sense. More particularly, such terms are used to avoid confusion when working with a mixture of active-low and active-high signals and to represent the fact that the invention is not limited to the illustrated/described signals, but could be implemented with a total/partial reversal of any of the active-low and active-high signals by a simple change in logic. More specifically, the terms assert and assertion indicate that a signal as active independent of whether the level is represented by a high or a low voltage, while the terms negate and negation indicate that a signal is inactive. As a final note, well-known power connections and other components have not been shown within the drawing figures for simplicity of illustration and discussion and so as not to obscure the invention.

Although example embodiments of the present invention will be described using specific interface buses, practice of the invention is not limited thereto but rather, the invention may be practiced with other types of buses in other types of environments.

FIG. 1 illustrates an example of the operation of SMI generation logic. As shown in FIG. 1, SMI generation is enabled by setting a particular bit and is controlled by the End Of SMI (EOS) bit 120. The EOS bit is first set 100 to enable the generation of the first SMI. When an enabled SMI# generation event occurs 130, the EOS bit is reset 110. When this bit is cleared, the SMI# signal to the processor is asserted. The processor then enters the SMM and the SMI handler services all requesting SMIs. If an SMI event occurs while this bit has been cleared, no additional SMIs to the processor are generated. However, the appropriate status bits may be set and at the end of the SMI handler, this bit is set. When set, the SMI# signal may be driven inactive for a minimum of one clock cycle. The combination of this bit being set and another SMI request being active (that is, one of the SMI status bits being set) causes the EOS bit to again be reset and the SMI signal to be reasserted to the processor.

Figure 2:
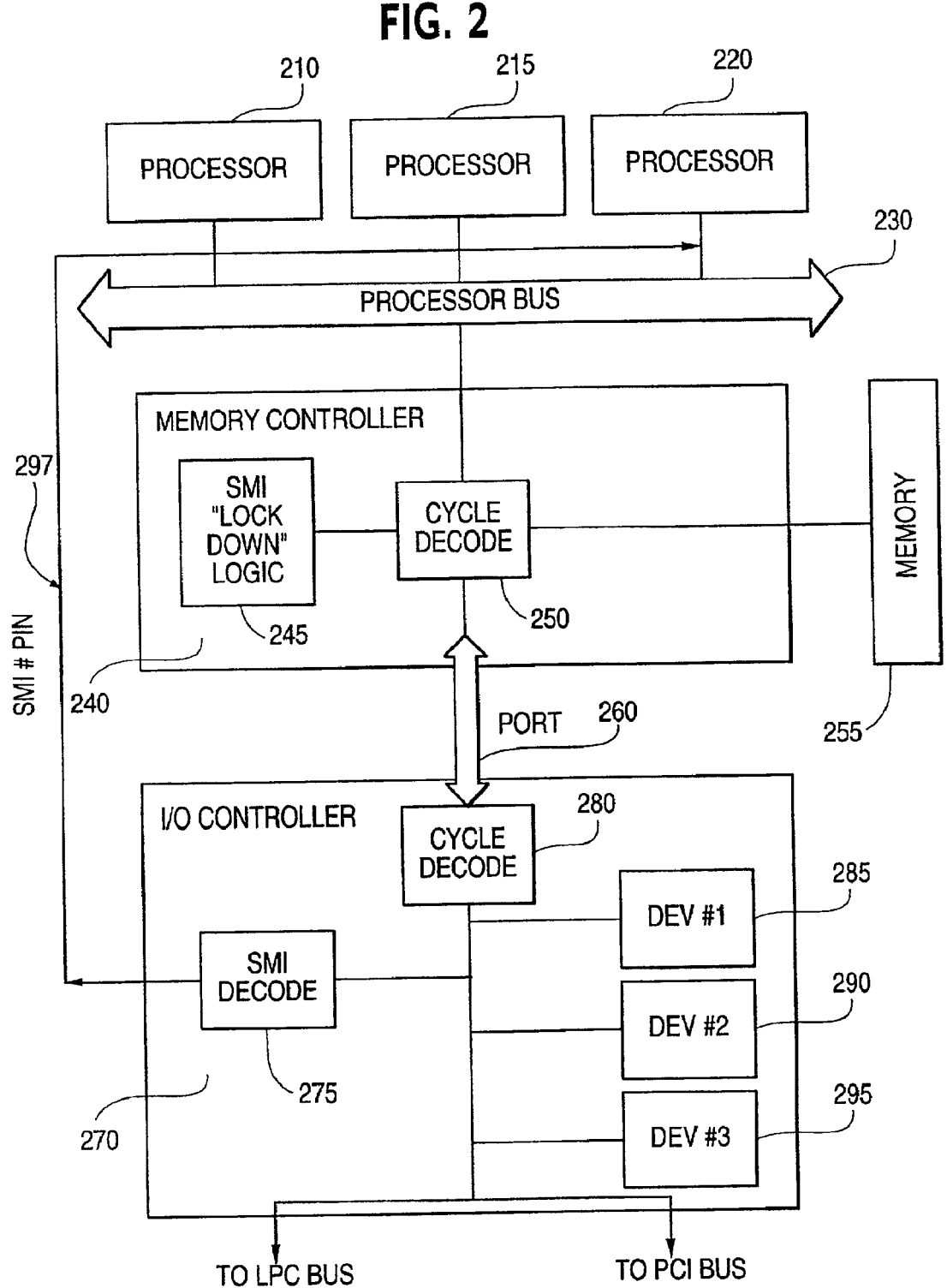
FIG. 2 is a block diagram illustrating an example embodiment in accordance with the present invention.

FIG. 2 is a block diagram illustrating an example embodiment accordance with the present invention. As shown in FIG. 2, a plurality of processors 210, 215, and 220 are connected to a processor bus 230. A memory controller 240, including SMI "Lock Down" logic 245 and cycle decode 250, is also connected to the processor bus 230. The memory controller 240 is connected to a memory 255. The memory controller 240 is also connected via a port 260 to an I/O controller 270. Included in the I/O controller 270 is an SMI decode 275, a cycle decode 280 and a plurality of devices 285, 290, and 295. The I/O controller 270 is also connected to an LPC (Low Pin Count) bus and a PCI (Peripheral Component Interconnect) bus. Lastly, an SMI# pin 297 connects the SMI decode 275 of the I/O controller 270 to the plurality of processors 210, 215, and 220.

Note that only three processors have been shown merely for exemplary purposes. The present invention is operable with any number of processors. Similarly, only three devices have been shown merely for exemplary purposes. The present invention is operable with any number of devices. Lastly, the specifically denoted buses are merely for exemplary purposes and the present invention is not limited to such buses.

In a system such as that shown in FIG. 2, every once in awhile it may be necessary to stop a thread of execution by one of the processors with a high priority interrupt, such as the SMI interrupt. This can occur for various reasons including debugging an instruction that is not working properly or to effect a workaround in the case of a known system bug. In the case of a single processor system, there is no problem in that upon receiving the interrupt, the single processor performs the necessary operation or operations required by the interrupt and then returns to the interrupted thread of execution. The processor does not have to determine if the interrupt is directed to it since there is only a single processor.

However, in a multiprocessor system, such as that illustrated in FIG. 2, or in a system having one or more of the newer processors which are capable of executing two or more different threads simultaneously, it was previously necessary for each processor, upon receiving the SMI interrupt, to determine if it is the processor to which the SMI interrupt was directed.

Since SMI interrupts are normally I/O cycles, they take a great deal of time to complete, thereby tying up the processor involved in the SMI interrupt until the cycle has been completed. Such I/O cycles, may involve processor 210, for example, being connected to device #2 290 or being connected to a device which is not shown in FIG. 2 via the LPC bus or the PCI bus. The processor 210 launches an IN INSTRUCTION or an OUT INSTRUCTION which are commonly used terminology for an I/O operation. The actual assembly code is normally called IN or OUT. When these instructions are launched, the thread that the processor 210 was previously performing is halted until the instruction is completed. The instruction is fowarded from the processor 210 through the processor bus 230 to the memory controller 240. In the memory controller 240, the instruction goes to the cycle decode 250 and is directed to the I/O controller 270 via the port 260. The cycle decode 250 determines if the instruction is for the I/O controller 270 or should be directed to the memory 255 and in this case has determined that the instruction is for the I/O controller 270. In a similar fashion, the cycle decode 280 in the I/O controller 270 determines if the instruction is to be directed to one of the internal devices 285, 290, or 295 in the I/O controller 270 or is to be directed to an external device via the LPC bus or PCI bus. Simultaneously, there is another block labelled SMI decode 275 in the I/O controller 270 which determines if an SMI is needed. That is, the system BIOS (Basic Input/Output System), for example, may be programmed to generate an SMI upon the occurrence of a particular I/O instruction.

Thus, if this particular I/O instruction requires the generation of an SMI, the SMI decode 275 provides a predetermined output on the SMI # pin 279 which is connected to processors 210, 215, and 220. Then, assuming that the instruction was a read from device #2 290, then the device 290 finishes the read operation and provides the requested data. The memory controller 240 receives the data via the port 260 along with an indication that an SMI was generated on the cycle and the processor has been interrupted. The cycle decode 250 in the memory controller 240, in view of the SMI, instructs the SMI lock down logic 245 to store information regarding the SMI, such as the address of the cycle, whether it was a READ or a WRITE cycle, and what processor it was from. All of this information is stored in the lock down logic 245 so that the processor receiving the SMI can halt the thread of execution presently being performed and load a new thread corresponding to the SMI and subsequently return to the previously halted thread of execution after performing the thread corresponding to the SMI.

The BIOS could then easily handle the SMI. For example, assume that the device 290 is returning bad data due to a hardware bug, such as returning the number 5 rather than the number 4. If the BIOS has been programmed to correct such a bug, then the SMI changes the data from 5 to 4 prior to completing the cycle. That is just one particular example. Other examples may include reading and/or writing to and from various devices over one or more cycles.

Upon completion of the SMI, the processor now needs to know which thread to restart and when to restart the thread and where to restart the thread. Note that the SMI # pin 297 goes to all of the processors 210, 215, and 220. Accordingly, when the SMI occurred, all three processors stopped and the BIOS was loaded on all three of the threads of execution. The BIOS then reads the information stored in the lock down logic 245 and determines that the instruction was associated with processor 215. The BIOS running on processor 210 thus determines that the SMI isn't for that processor so that the processor 210 exits the thread of execution for the BIOS and returns to the thread of execution that it was performing. Similarly, all of the processors other than processor 215 can determine that the SMI is not for them and they may return to their regular thread of execution. On the other hand, processor 215 determines that the SMI is for that processor and performs the special operations directed by the SMI, such is changing the number 5 to number 4, etc.

Upon completion of the SMI instructions, the processor 215 returns to its regular thread of execution and the SMI lock down logic 245 is cleared so as to be subsequently available for the next SMI.

It is of course understood that the SMI lock down logic 245, as well as many of the other elements of FIG. 2, may be implemented by either hardware or software. Furthermore, while the SMI lock down logic 245 is shown as being in the memory controller 240, it is not necessary for the SMI lock down logic 245 to be in the memory controller 240 but rather could be in the I/O controller 270 or even located in the processors themselves. All that is necessary is that the SMI lock down logic 245, wherever located, stores information regarding the SMI, such is the address of the cycle, whether it was a READ or WRITE cycle, and what processor it was from.

As illustrated in FIG. 3, after starting at box 300, normally, the processors 210, 215, and 220 of FIG. 2 each issue instructions for their respective execution threads in box 310. In box 320, the cycle decode 250 of the memory controller 240 Decodes the instructions from the processors to allow data flow to and from the memory 255. Furthermore, in box 330, the cycle decode 280 of the I/O controller 270 Decodes instructions fowarded to it via the port 260 to control data flow to and from the devices 285, 290, and 295 within the I/O controller 270 and to external devices (not shown) via the LPC and PCI buses. In box 340 of FIG. 3, the SMI decode 275 decodes an interrupt instruction and outputs a signal to the processors 210, 215, and 220 via the SMI# Pin 297. In step 350, the I/O controller 270 returns a signal to the SMI lock down logic 245 instructing it to store information on a processor cycle that results in an interrupt such as an address of the processor cycle, an indication as to whether the cycle was a READ or a WRITE cycle and an identity of the processor which generated the processor cycle. In box 360, the selected processor performs the interrupt instructions while simultaneously, in box 370, the other processors continue their execution threads. In box 380, the selected processor, after having performed the interrupt instructions, returns to the execution thread which was being performed just prior to the interrupt and in box 390, the process ends.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations in modifications in the component parts and/or arrangements, alternative uses law also be apparent to those skilled in the art.

For example, the invention is not limited to the number of processors illustrated in the drawing figuress but rather may be used with any number of processors. Furthermore, while specific buses have been shown in the drawing figures, the invention is not limited thereto but may be used with any appropriate interconnection buses. Lastly, as noted above, the SMI lock down logic may be implemented by both hardware and software.

What is claimed is:

1. An apparatus comprising:
   a memory controller connected to at least one processor of a plurality of processors to control a memory in response to instructions from said at least one processor;
   an I/O controller connected to said memory controller to control data flow to at least one device in response to instructions from said at least one processor; and
   lock down logic to store captured cycle information of said processor cycle that results in a system management interrupt and to transfer the captured cycle information to each processor of said plurality of processors in response to said system management interrupt.

2. The apparatus of claim 1, the captured cycle information stored in the lock down logic comprising at least one of:
   an address of the processor cycle;
   an indication as to whether the cycle was a READ or a WRITE cycle; and
   an identity of said at least one processor which generated the processor cycle.

3. The apparatus of claim 1, wherein said lock down logic is disposed within one of:
   said memory controller;
   said I/O controller; and
   said at least one processor.

4. The apparatus of claim 1, said memory controller comprising a cycle decode to decode instructions from said at least one processor.

5. The apparatus of claim 1, said I/O controller comprising a cycle decode to decode instructions from said at least one processor.

6. The apparatus of claim 1, said I/O controller comprising an interrupt decode to decode said system management interrupt and output a system management interrupt signal to said at least one processor.

7. A method comprising:
   detecting a system management interrupt in response to decoding instructions from at least one processor of a plurality of processors;
   outputting a system management interrupt signal to the at least one processor in response to the system management interrupt;
   capturing and storing cycle information of a processor cycle that results in the system management interrupt, and
   transferring at least a portion of the captured cycle information to each processor of the plurality of processors in response to the system management interrupt.

8. The method of claim 7, the stored captured cycle information comprising at least one of:
   an address of the processor cycle;
   an indication as to whether the cycle was a READ or a WRITE cycle; and
   an identity of the at least one processor which generated the processor cycle.

9. A method comprising:
   controlling a memory in response to instructions from at least one processor of a plurality of processors;
   controlling data flow to at least one device in response to instructions from the at least one processor;
   storing captured cycle information associated with a processor cycle that results in a system management interrupt; and
   transferring at least a portion of the captured cycle information to each processor of the plurality of processors.

10. The method of claim 9, the captured stored cycle information comprising at least one of:
    an address of the processor cycle;
    an indication as to whether the cycle was a READ or a WRITE cycle; and
    an identity of the at least one processor which generated the processor cycle.

11. The method of claim 9, wherein the captured cycle information is stored within one of:
    a memory controller;
    an I/O controller; and
    the at least one processor.

12. The method of claim 9, further comprising decoding instructions from the at least one processor with the memory controller.

13. The method of claim 9, further comprising decoding instructions from the at least one processor with an I/O controller.

14. The method of claim 9, further comprising detecting a system management interrupt and outputting a system management interrupt signal to the at least one processor with an interrupt decode.

15. A program storage device readable by a machine, tangibly embodying a program of instructions executable by the machine to perform a method comprising:
    decoding instructions from at least one processor of a plurality of processors to decode a system management interrupt;
    outputting a system management interrupt signal to the at least one processor in response to the decoded interrupt;
    capturing and storing cycle information on a processor cycle that results in a system management interrupt; and
    transferring at least a portion of the captured cycle information to each processor of the plurality of processors.

16. The program storage device of claim 15, the stored captured cycle information comprising at least one of:
    an address of the processor cycle;
    an indication as to whether the cycle was a READ or a WRITE cycle; and
    an identity of the at least one processor which generated the processor cycle.

17. A program storage device readable by a machine, tangibly embodying a program of instructions executable by the machine to perform a method comprising:
controlling a memory in response to instructions from at least one processor of a plurality of processors;
controlling data flow to at least one device in response to instructions from the at least one processor;
storing captured cycle information associated with a processor cycle that results in a system management interrupt; and
transferring at least a portion of the captured cycle information to each processor of the plurality of processors.

18. The program storage device of claim 17, the stored captured cycle information comprising at least one of:
an address of the processor cycle;
an indication as to whether the cycle was a READ or a WRITE cycle; and
an identity of the at least one processor which generated the processor cycle.

19. The program storage device of claim 17, wherein the captured cycle information is stored within one of:
a memory controller;
an I/O controller; and
the at least one processor.

20. A method comprising
determining that execution of an instruction by a processor of a plurality of processors results in a system management interrupt,
storing a processor identifier that identifies the processor that executed the instruction resulting in the system management interrupt,
sending a system management interrupt signal to each processor of the plurality of processors in response to the system management interrupt, and
in response to receiving the system management interrupt signal, executing a system management thread with the processor identified by the processor identifier.

21. The method of claim 20 further comprising in response to receiving the system management interrupt signal, executing a thread other than the system management thread with a processor not identified by the processor identifier.

22. A method comprising
determining that execution of an instruction by a processor of a plurality of processors results in a system management interrupt,
storing a processor identifier that identifies the processor that executed the instruction resulting in the system management interrupt, and
executing a thread other than a system management thread with a processor not identified by the processor identifier.

23. The method of claim 22 further comprising executing the system management thread with the processor identified by the processor identifier.

24. A system for a plurality of processors comprising
an interrupt decoder to generate a system management interrupt signal in response to an instruction executed by a processor of the plurality of processors, and
logic to store a processor identifier for the processor that executed the instruction resulting in the system management interrupt, wherein
the interrupt decoder provides each processor of the plurality of processors with the system management interrupt signal, and
wherein a processor in response to the system management interrupt signal executes a system management thread if identified by the processor identifier of the logic and does not execute the system management thread if not identified by the processor identifier of the logic.

25. The system of claim 24 wherein the interrupt decoder instructs the logic to store the processor identifier.

26. The system of claim 24 wherein each processor of the plurality of processors in response to the system management interrupt signal determines whether the processor identifier of the logic identifies the processor.

27. A method comprising
simultaneously executing a first thread and a second thread with a processor, and
simultaneously executing the second thread and a system management thread with the processor in response to determining that execution of the first thread caused a system management interrupt.

28. The method of claim 27 further comprises
suspending execution of the first thread with the processor to execute a system management interrupt handler in response to the system management interrupt, and
invoking execution of the system management thread with the processor in response to the system management interrupt handler determining that the first thread caused the system management interrupt.

29. The method of claim 27 further comprising
suspending execution of the second thread with the processor to execute a system management interrupt handler with the processor in response to the system management interrupt, and
resuming execution of the second thread with the processor in response to the system management interrupt handler determining that execution of the second thread with the processor did not cause the system management interrupt.

30. The method of claim 27 further comprising
executing a third thread with another processor,
suspending execution of the third thread with the another processor to execute a system management interrupt handler with the another processor in response to the system management interrupt, and
resuming the execution of the third thread with the another processor in response to the system management interrupt handler determining that the execution of the third thread with the another processor did not cause the system management interrupt.

* * * * *